(12) United States Patent
Hermanns et al.

(10) Patent No.: US 6,311,919 B1
(45) Date of Patent: Nov. 6, 2001

(54) YARN GUIDE FOR THE TRAVERSING DELIVERY OF A YARN TO A ROTATIONALLY DRIVEN TAKEUP BOBBIN

(75) Inventors: Ferdinand-Josef Hermanns, Erkelenz; Franz-Josef Flamm, Stolberg; Christian Sturm, Krefeld, all of (DE)

(73) Assignee: W. Schlafhorst AG & Co. (DE)

( * ) Notice: Subject to any disclaimer, the term of this patent is extended or adjusted under 35 U.S.C. 154(b) by 0 days.

(21) Appl. No.: 09/467,203

(22) Filed: Dec. 20, 1999

(30) Foreign Application Priority Data

Dec. 18, 1998 (DE) .............................. 198 58 548

(51) Int. Cl.$^7$ .......................... B65H 54/28; H02K 35/00
(52) U.S. Cl. ................... 242/477.3; 242/481.2; 242/483.9; 310/17; 310/19; 310/21; 318/127
(58) Field of Search ............... 242/477.3, 481.2, 242/483.9; 310/15, 17, 19, 20, 21; 318/123, 127

(56) References Cited

U.S. PATENT DOCUMENTS

| | | | |
|---|---|---|---|
| 2,848,173 | * | 8/1958 | Hebberling .................. 242/483.9 X |
| 2,869,797 | | 1/1959 | Clerc . |
| 2,986,683 | * | 5/1961 | Lavet et al. ..................... 310/15 X |
| 3,094,292 | * | 6/1963 | Hebberling .................. 242/481.2 X |
| 3,360,704 | * | 12/1967 | Kohlhagen ..................... 310/21 X |
| 4,349,757 | * | 9/1982 | Bhate ............................ 310/15 |
| 5,908,170 | | 6/1999 | Kunz . |

FOREIGN PATENT DOCUMENTS

| | | |
|---|---|---|
| 38 02 267 A1 | 8/1989 | (DE) . |
| 39 07 125 C2 | 9/1992 | (DE) . |
| 07137934 A | 5/1995 | (JP) . |
| 07137935 A | 5/1995 | (JP) . |
| 08217332 A | 8/1996 | (JP) . |

OTHER PUBLICATIONS

Abstract for EP 0838422—See reference "AA" above.

* cited by examiner

Primary Examiner—Michael R. Mansen
(74) Attorney, Agent, or Firm—Kennedy Covington Lobdell & Hickman, LLP

(57) ABSTRACT

A yarn guide imparts a traversing motion to a yarn being delivered to a rotationally driven takeup bobbin in a textile yarn winding operation to create a cross-wound bobbin, or cheese. The yarn guide includes a fork-like yarn guide pivoted about a pivot axis substantially perpendicular to the axis of the takeup bobbin, and an electromagnetic mechanism for driving the guide. The electromagnetic mechanism includes an air gap, a plurality of magnets disposed along the air gap, a plurality of yokes and at least one electrical coil extending into and moveable along the air gap with the traversing yarn guide. The magnets are disposed along the air gap and generate magnetic field lines which extend in a substantially perpendicular direction through the air gap.

25 Claims, 8 Drawing Sheets

YARN GUIDE FOR THE TRAVERSING DELIVERY OF A YARN TO A ROTATIONALLY DRIVEN TAKEUP BOBBIN

CROSS-REFERENCE TO RELATED APPLICATION

This application claims the benefit of German Application DE 19858548.9, filed Dec. 18, 1998, herein incorporated by reference.

FIELD OF THE INVENTION

The present invention relates to a yarn guide and, more particularly, to a yarn guide for the traversing delivery of a yarn to a rotationally driven takeup bobbin for creating a cross-wound bobbin, or cheese, in a bobbin winder of a textile machine as generically defined by the characteristics of the preamble to the first claim.

BACKGROUND OF THE INVENTION

To make textile bobbins, it is necessary in principle on the one hand to make the bobbin rotate and on the other to traverse the traveling yarn, which is being wound onto the rotating bobbin, along the bobbin axis. If the yarn is traversed very slowly, a bobbin with highly parallel windings is created. If such a bobbin is meant to have a relatively large volume and to have flat face ends disposed substantially at right angles to the bobbin axis, then boundary disks are required on both ends of the package. These boundary disks are not necessary if the yarn is traversed fast enough to produce a cross winding. High winding speeds thus require a very high traversing rate as well.

Drive means such as belts, oriented parallel to the bobbin axis, can be used for this purpose. European Patent Disclosure EP 0 311 827 A2 describes one such yarn guide in which the belt is driven by means of a microprocessor-controlled stepper motor. High traversing speeds can be attained and the yarn guide can be controlled relatively precisely.

So-called shogging rollers are also very widely used to create the traversing motions; in high-speed bobbin winders, they often simultaneously utilized to provide the circumferential drive for the cheese. However, the laying angle dictated is always the same, regardless of the bobbin fullness, and at certain rpm ratios between the bobbin and the drive roller, so-called ribbon windings occur, which later present considerable unwinding problems. The prior art therefore describes many so-called ribbon breaking methods.

To create a predetermined winding pattern, such as a precision or graduated precision winding, the bobbin must be driven separately from the yarn guide. This can be done, among other ways, by spacing the aforementioned shogging roller apart from the takeup bobbin, which is driven separately. As a rule, a yarn guide then slides in the shogging groove. This system has disadvantages because of inertia.

So-called finger yarn guides have also long been known (for instance from published, examined German Patent Application DE AS 11 31 575 and published, unexamined German Patent Application DE OS 15 60 360), in which a finger- or fork-like yarn guide is pivotable about an axis disposed substantially perpendicular to the takeup bobbin axis. Instead of the conventional mechanical drive mechanisms described therein, electromechanical drive mechanisms have meanwhile been proposed for these fork-like yarn guides of the kind suggested for instance in European Patent Application EP 0 808 791 A2 or in European Application EP 0 838 442 A1, which representatively describe this basic type of drive. However, these references merely mention that these drive means are electric motors. It can be assumed that either the rotary motion of the motor is converted into a pivoting motion of the yarn guide finger, via gear means that increase the inertia of regulation, or else a motor is used that drives the yarn guide finger directly, and in the case of a stepper motor generates the desired pivoting angle via a predeterminable number of steps. Given the high speed and the high direction-reversal frequency, stepping errors can occur, which then lead to a permanent shifting of the drive mechanism and consequently to winding flaws.

In conventional electric motors, such as electronically commutated motors, it is also difficult on the one hand to generate a required high moment at the turning points but on the other to keep the mass of the rotor, which executes only a pivoting motion, small enough that the resultant mass inertia does not further increase the required moment.

SUMMARY OF THE INVENTION

It is accordingly an object of the invention to improve the aforementioned electromechanical type of drive for a traversing yarn guide in a bobbin winder.

This object is attained according to the invention by a yarn guide for imparting a traversing motion to a yarn in a textile yarn winding operation. In such an operation, the yarn is being delivered to a rotationally driven takeup bobbin. The traversing motion creates a cross-wound bobbin, or cheese. According to the present invention, the yarn guide comprises a fork-like guide element, pivoting means for pivoting about a pivot axis oriented substantially perpendicular to the axis of the takeup bobbin, and an electromagnetic mechanism. The electromagnetic mechanism comprises an air gap, a plurality of magnets disposed along the air gap, a plurality of yokes and at least one electrical coil extending into the air gap. The magnets are disposed along the air gap and generate magnetic field lines which extend in a substantially perpendicular direction through the air gap. Current may be supplied to the electrical coil, which is movable along the air gap.

The invention achieves a number of advantages. According to the invention, a relatively high magnetic flux density can be achieved inside the air gap, and the losses, given a small air gap width and adequate dimensioning of the yokes, which have a low magnetic resistance, are low. By supplying current to the coil, which is located in the region of the magnetic field lines, the moment required to deflect the yarn guide is attained.

The dimensioning of the coil is closely related to the adaptation to the gap width of the air gap according to the invention, through which the magnet lines flow. The spacing of the windings of the coil that extend into the air gap from the pivot axis of the yarn guide determines the magnitude of the moment that can be attained by the drive mechanism. This moment is great in proportion to the mass inertia of the coil. The other parts of the body involved in the oscillation can be made from very lightweight material and need merely have the stability required for the incident forces, so that low mass inertia is obtained.

The air gap, and thus all the elements for generating the magnetic field, need merely extend over the pivoting range of the electrical coil, which corresponds to the maximum settable traversing stroke of the yarn guide. The engineering expense is thus limited accordingly. Similarly, only one electrical coil is needed, which during the oscillation moves up and down along the suitably dimensioned slip. As previously noted, it is of particular importance that the elements involved in the pivoting motion have the least possible mass, since at the region at the center of the oscillation of the yarn guide, considerable angular accelerations must be achieved and accordingly, given high mass inertia of the oscillating parts, very high moments must be imposed. It must be taken into account here that in the manufacture of cheeses or bobbin winders, yarn guide oscillation frequencies may range up to 30 Hz.

To generate the magnetic field, it is enough for magnets to be disposed on one side of the air gap. A yoke is then disposed directly on the opposite side of the air gap from the back side of the magnet assembly. The magnetic field lines thus for the most part extend within good magnetic conductors. The air gap can be made small, as already described above, so that the magnetic resistance is further limited.

However, according to another aspect of the invention, it is also possible to dispose magnets on both sides of the air gap, as a result of which the magnetic flux density can be further increased and greater moments can be attained.

In another aspect of the invention, the magnets can either be permanent magnets, which need not be connected to a power supply, or electromagnets, with which a higher magnetic flux density, and thus even greater capacity, are attainable.

In yet another aspect of the invention, the magnets may be disposed in a first magnet region and a second magnet region, with the boundary between the regions being generally located adjacent the center of the electrical coil pivoting range. In the first magnet region, the polarities of the magnets are arranged such that their magnetic flux occurs in a first direction, and in the second magnet region, the polarities of the magnets are arranged such that their magnetic flux occurs in a second direction, the second direction being generally opposite the first direction. Thus, it is assured that the same moment with the same orientation is brought to bear on the two winding legs of the electrical coil. This is obtained from the opposed current flow direction and the opposed magnetic flux directions. It must be noted that although the moments must have the same direction if the system is to be operated at high efficiency, it is nevertheless not compulsory for the magnitude of the moments to be identical in both winding legs. A different magnitude could for instance occur if the magnetic fields are of various intensities, or if the courses of the winding legs inside their respective associated magnetic fields differ from one another.

Unlike an electronically commutated motor, in which commutation is necessary during the direction of action, which remains constant, of the drive moment, in the present invention a change of current direction leads directly to the reversal of the algebraic sign of the drive moment. This in turn simplifies the triggering of the direct drive of the oscillating yarn guide.

According to another feature of the invention, the windings of the electrical coil that are required to generate the moment and that extend into the air gap are disposed entirely at a relatively great spacing from the pivot point of the yarn guide, so that the leverage which is created may be utilized to generate a relatively high moment.

By comparison, in another feature of the invention, some of the moment generating winding legs of the electrical coil are disposed relatively close to the pivot point of the yarn guide. In this connection it should be pointed out that the distance from the pivot point should be suitably limited, because as the distance from the pivot point increases, the coil also increasingly generates a moment of inertia that counteracts the drive. In this example, however, a majority of the electrical coil are not involved in the moment generation and are located radially farther outward than those winding legs that are involved in the moment generation. Nevertheless, because of its great spacing from the pivot point of the yarn guide, this passive part of the coil with respect to the drive moment contributes to a higher moment of inertia of the yarn guide.

Overall, however, this aspect of the invention also utilizes a drive device that an be open- or closed-loop controlled very easily, is simple in structure, and has high efficiency.

The magnitude and direction of the moment is set by open- or closed-loop control of the current in every phase of the motion. This can be done via a control device in the form of a microprocessor, which controls the current intensity and current direction in accordance with a predeterminable program as a function of angle and time, in such a way that over the traversing width, the desired lay angle of the yarn at the time is obtained, or the traversing width or the traversing end points can be adjusted. By suitable sensor means, the applicable angle is detected, the adherence to the set-point value is checked, and if necessary, the actual value is adapted to the set-point value again by closed-loop control, also known as regulation. Known PID controllers can be used for this purpose, while the instantaneous angle may be determined utilizing, for example, a known infrared light gate, which scans markings that are arranged concentrically to the axis of oscillation.

As already noted above, the moment to be brought to bear over the substantially predominant portion of the stroke distance is very small, while because of the very high angular accelerations at the direction-reversal locations of the yarn guide, very high moments have to be generated at these locations. In order for a known end stage to generate the correspondingly high voltage values for the abruptly more-intensive supply of current to the electrical coil, this end stage must be operated with a high operating voltage. It also proves difficult to generate a sudden voltage change, of the kind necessary here, within a known end stage. In the usual digital triggering of an end stage via pulse width modulation, extremely short pulse widths must alternate with extremely long pulse widths because of the required voltage peaks. These extremely short pulse widths present greater demands on the control technology. Furthermore, given what is a markedly excessive voltage for the substantially predominant portion of the operating period, the pulse width modulation required to establish the requisite low voltage would lead to a considerable power loss.

To overcome these disadvantages, another aspect of the invention provides that a second supply voltage source may be utilized, at which an operating voltage is available which is a multiple of that at the first supply voltage source. This second supply voltage source is connected to the electrical coil at the direction-reversal locations of the yarn guide, so that the requisite instantaneously-needed high moment is available there, without having to expect an overall high power loss.

By the use of a suitably dimensioned capacitor, the necessary voltage can be instantaneously furnished at the second supply voltage source. This capacitor also assures that the voltage will not break down prematurely.

According to yet another aspect of the present invention, it is especially advantageous if the capacitor is charged by means of a charge pump between each two clearing actions of the capacitor. As a function of the frequency of the oscillating system, the charge pump can be adjusted such that the requisite charge duration is equivalent to the time between two successive clearing actions. This makes continuous operation of the charge pump possible.

The higher angular acceleration attainable shortens the dwell time of the yarn guide and thus also of the yarn in the region of the endpoints of the traversing width. This in turn makes the density of the cheese more uniform, because the dwell time of the yarn in the peripheral zones is approximately equal to the dwell time in the remainder of the cheese.

In a still further aspect of the present invention, a very high voltage, and thus a very high moment, can be brought to bear on the electrical coil, without causing saturation phenomena inherent in a conventional electric motor. Because of the instantly available high voltage provided by the second supply voltage source or through capacitor discharge, the current forced through the electrical coil rises markedly faster, and so the proportional torque can rise correspondingly quickly as well.

To further aid in reversing the direction of motion, in yet another aspect of the present invention, it is also possible to use mechanical energy storing means at the direction-reversal locations, in a manner known per se. This lessens the maximum moment required at these locations. However, the yarn guide, which as noted should be as lightweight as possible in order to minimize the moment of inertia, must then be designed to be markedly more stable, and thus, heavier. Also, the yarn guide becomes louder and has a shorter service life. Last but not least, the control quality of the controller suffers from abrupt changes in moment as the yarn guide enters the energy storing means.

In another feature of the present invention, the use of an energy storing means, which with the yarn guide forms a substantially harmonically oscillating mechanical system, leads to a relief of the drive mechanism, or in other words, a reduction in the energy to be supplied to the drive mechanism, and does not have the described disadvantages of the springs disposed only in the peripheral region. The energy storing means reduces the area under the graph of the square of the drive moment to only one-third of the value that would be required without such an energy storing means. This means above all that even under heavy loads the drive mechanism does not become overheated. It must be remembered that the problem was not solvable by more generous dimensioning of the drive mechanism in many cases, because the coil mass increases the mass inertia of the oscillating parts and thus in turn increases the necessary moment for generating oscillation.

The energy storing means may comprise a spring, and in particular, a torsion spring. In the deflection range of approximately 30° to the left and right, which is the range of interest here, a spiral spring, especially of band-like material, can advantageously be used, because in this range it can be assumed that the spring's characteristic curve will ascend identically for deflection in either direction.

Instead of one spiral spring, it is also possible to use two spiral springs, and as a result the desired course of the resultant spring characteristic curve can be even better controlled. In addition, the spiral springs, disposed for instance on both sides of the oscillating part, can also be used for supplying current to the electrical coil.

To assure that in both directions of oscillation the same course of spring force will be achieved, the spiral springs should have opposed winding directions. This requirement becomes significant, however, only when the angle of deflection from the position of repose of the yarn guide exceeds a limit value, since the course of the spring characteristic curve then differs when the spring is being opened and when it is being closed.

This can also be the case, however, even at a lower oscillation amplitude, if in the direction-reversal region a progressive course of the spring characteristic curves already ensues. The selection of the spring accordingly reinforces the drive mechanism in the region in which the greatest moment is required.

The invention will be described in further detail below in terms of exemplary embodiments in conjunction with the drawings.

DETAILED DESCRIPTION OF THE DRAWINGS

DETAILED DESCRIPTION OF THE PREFERRED EMBODIMENTS

Figure 1:
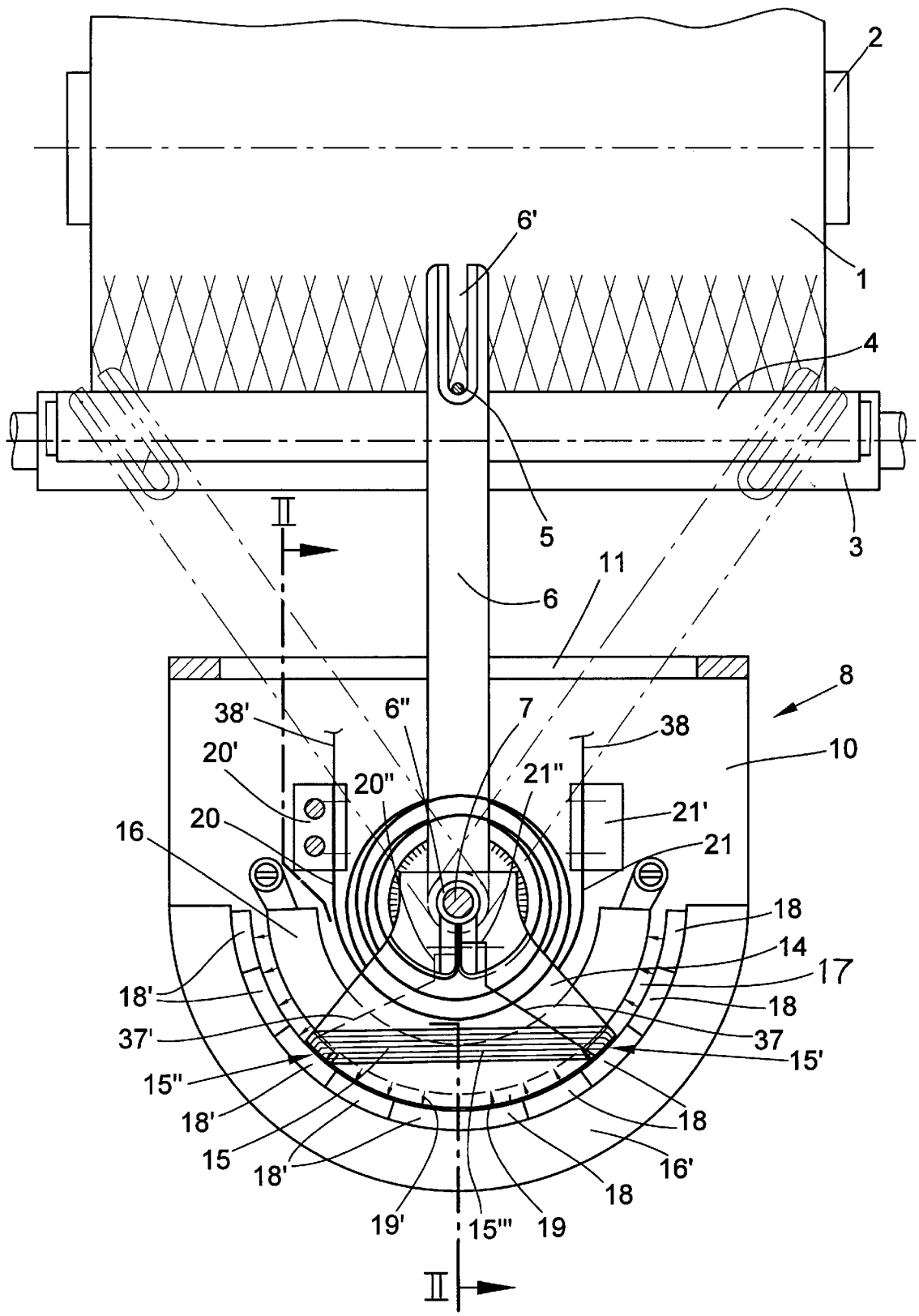
FIG. 1 is a front view of a yarn guide having an electromechanical drive mechanism in accordance with one embodiment of the present invention.

In the front view of a yarn guide having an electromechanical drive mechanism shown in FIG. 1, in accordance with one embodiment of the present invention, a cross-wound bobbin or cheese 1 can be seen, which rests on a support roller 3. The cheese 1 is supported by its bobbin tube 2 in a bobbin creel (not shown). The drive of the cheese can be effected via one of the tube plates of the creel, which clamp the bobbin tube 2 between them. Alternatively, instead of the support roller 3, a drive roller can be provided, by which, unlike the aforementioned direct drive of the cheese 1, a peripheral surface friction drive is effected.

The yarn 5 delivered to the cheese 1 is guided inside a fork-like guide element 6' of the yarn guide 6. A traversing ruler 4 assures the rectilinear guidance of the yarn, which is required so that the yarn will always be guided at a constant and as short as possible spacing from the clamping line between the support roller 3 and the cheese 1. This is necessary in order to attain a satisfactory winding structure of the cheese 1.

Instead of the rectilinear guidance provided by the traversing ruler 4, it would also be conceivable to drive a body, which contains a yarn guide eyelet and displaceably supported along the position of the traversing ruler 4, with a lever that corresponds to the yarn guide 6. However, then it must be remembered that additional forces of inertia and friction must be overcome, which at high traversing frequencies adversely affect the entire system.

Figure 2:
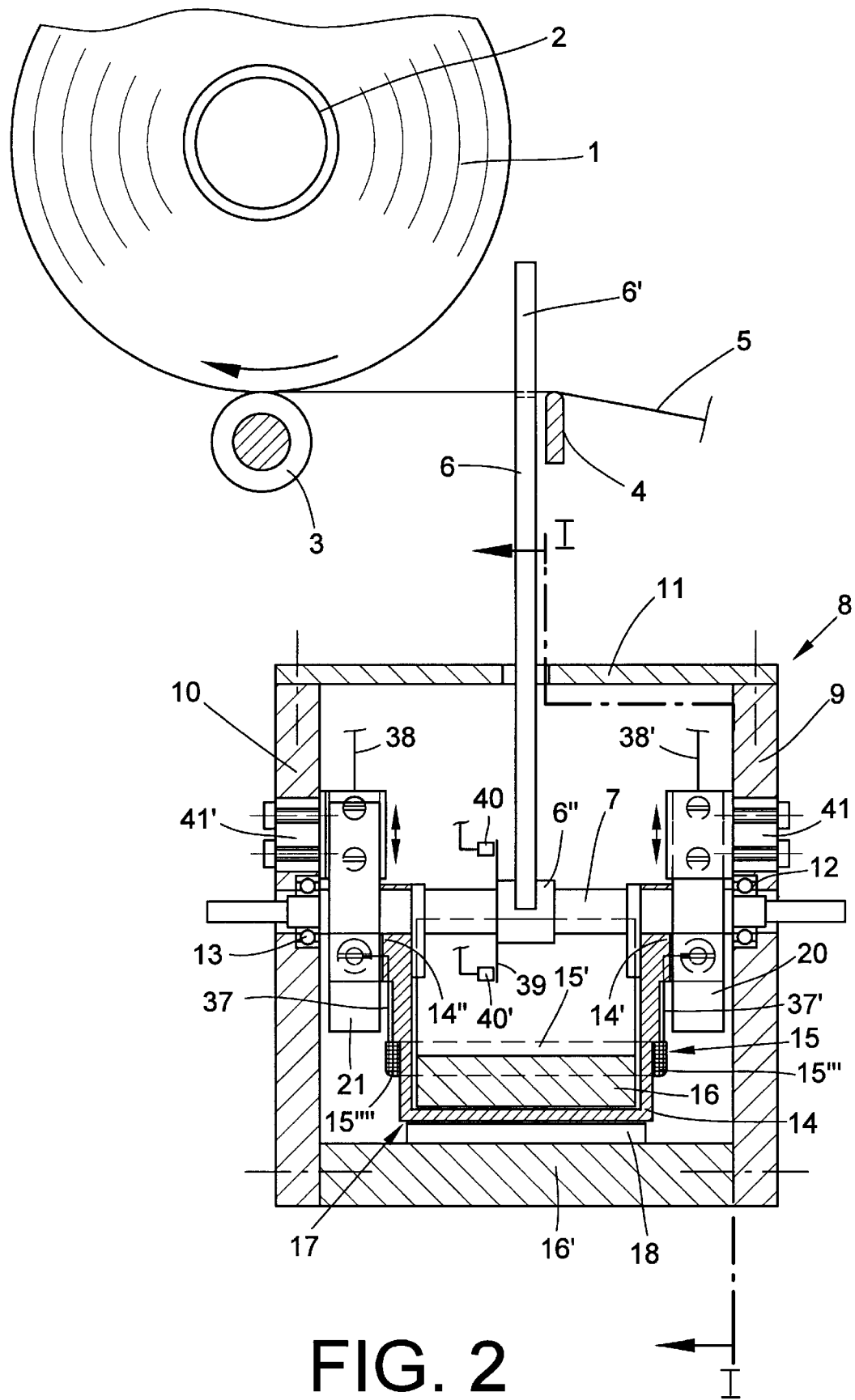
FIG. 2 is a side sectional view of the yarn guide of the embodiment of FIG. 1 taken along the section line II—II thereof.

The yarn guide 6 is secured via a mount 6" to a shaft 7. As seen in FIG. 2, this shaft 7 is in turn supported in roller bearings 12 and 13, which are disposed in side walls 9 and 10 of a housing 8. In order to limit further rotation, caused by inertia, of the roller bodies when the direction of motion of the yarn guide 6 is reversed, the roller bearing can be tensed more strongly than usual. Alternatively, however, it is also conceivable to use different bearings, such as, for example, magnet-based bearings.

A rocker-like coil carrier 14 is also secured to the shaft 7. Lateral tongue-like outriggers 14' and 14" of this coil carrier are connected, in a manner fixed against relative rotation, to an inward-protruding tongue of spiral springs 20 and 21, which are made of metal band material. The two spiral springs 20 and 21 are wound in opposite directions of rotation. A coil 15 is wound onto the coil carrier 14 in a manner such that its center axis intersects the pivot axis of the yarn guide 6, whereby the windings of the coil extend about the coil carrier 14 in four rectilinear extents, referred to herein as legs, 15', 15", 15''' and 15'''', angularly oriented to each other.

Mounts 20' and 21' of the torsion springs 20 and 21 are secured to the side walls 9 and 10 of the housing 8. The two torsion springs 20 and 21 are firmly fastened in these mounts 20' and 21'.

As represented by double arrows in FIG. 2, the mounts can be adjusted in their position relative to the side walls 9 and 10 by being shifted in oblong slots 41 and 41'. This adjustability is required, for at least one of the two mounts, so that it can be assured that the yarn guide 6 in a resting condition will assume a centered position within the range of its oscillation amplitude. Adjusting both torsion springs makes it possible for this center position to be the zero point of both spring characteristic curves simultaneously.

Current may be supplied to the coil 15 via lead lines 38 and 38' to the mounts 20' and 21', then via the torsion springs 20 and 21 to their fastening points to the shaft 7, and from there to the coil 15 via lead lines 37 and 37'. In this way, it is assured that the respective fixed lead lines will not be exposed to any relative motion. The relative motion is absorbed by the spiral springs 20 and 21. It is understood, however, that still other lead lines are conceivable that have high flexibility. In order then to limit the motion, these lead lines should be located as close as possible to the axis 7.

An inner yoke 16 of ferromagnetic material has the shape of an annular segment, as seen in FIG. 1, and has a rectangular cross section, as seen in FIG. 2. Opposite the outer circumference of the annular-segmental inner yoke 16, a magnet assembly 18, 18' is secured to a similarly annular-segmental outer yoke 16'. Between the outer circumference of the inner yoke 16 and the magnet assembly 18, 18', an air gap 17 is formed, which has a constant gap width over its length. However, such a constant gap width is not compulsory. For instance, the air gap 17 could be wider in the middle of the left and right halves of the air gap 17 and could thereby attenuate the magnet field, since the active extents, or legs, 15' and 15" of the coil windings 15, are located thereat when the yarn guide 6 assumes its center position, in which only slight drive moment, or none at all, is needed.

The magnets are polarized differently on the left and right sides of the center point of the pivoting range of the coil 15. The result is that in a first region of the magnets 18 magnetic field lines 19 are formed which are essentially aimed at the pivot point of the yarn guide, while in a second region of the magnets 18', magnetic field lines 19' that point away from the yarn guide are formed.

The field lines extending through the yokes 16 and 16' are not shown for the sake of simplicity. However, in both yokes 16 and 16' they form bridges and all the magnetic field lines extend through the center of the U-shaped yokes. It is therefore also possible to embody the yokes with a markedly reduced cross section in the peripheral region compared to the center.

During the entire pivoting motion of the yarn guide 6, one of the two winding legs, either 15' or 15", of the electrical coil 15 extends within a respective one of the two portions of the air gap 17, the portions differing in terms of the direction of the magnetic field lines. Because of the winding plane of the coil 15, there are necessarily different resultant directions of electrical current in the two winding legs 15' and 15", and thus the moment exerted on the winding legs 15' and 15" by the magnetic field, represented by the magnetic field lines 19 and 19', has the same algebraic sign. The arc spacing of the two winding legs 15' and 15" from one another is greater than the distance covered along the air gap 17 at a maximum pivoting angle of the yarn guide 6. As a result, each winding leg 15' and 15" travels only within an air gap region in which the magnetic field lines 19 and 19' extend in a uniform direction. As a result, over the entire pivoting distance, the current and moment are proportional, in particular with respect to their algebraic sign. The expense for open- or closed loop control can thus be kept low.

The housing 8 is provided with a lid 11, which includes a slit within which the yarn guide 6 is movable. Instead of mounting the yarn guide 6 centrally on the shaft 7, it is also possible to fix this yarn guide on the shaft 7 outside the housing 8, in which case the housing 8 can be fully encapsulated.

On the shaft 7, in the region of the yarn guide mount 6", there is a disk 39, which has markings concentric to the center axis of the shaft 7. These markings are scanned with two infrared light gates 40, 40'. By disposing the two infrared light gates 40, 40' offset with respect to the pitch of the markings, it is possible to ascertain the direction of motion of the disk at a given time. The angular adjustment of the yarn guide 6 at that time can thus be ascertained by counting the increments. To further increase the number of increments over the pivoting path, it is possible to provide additional infrared light gates, which correspondingly increases the number of increments for the same pivoting angle. However, in order to have sufficiently high resolution for the controller even near the direction-reversal locations of the yarn guide, it is recommended than an observer be used as described, for example, in German Patent Disclosure DE 19 73 5581 A1. The increments measured by the infrared sensor 40 are sent to a microprocessor (not shown) in which a set-point course of the oscillation of the yarn guide is stored in memory and a closed-loop controller, which outputs as its controlled variable the current eye that flows through the coil 15, is connected. Thus, the desired drive moment can be generated over the entire course of oscillation. To refine the closed-loop control and for the sake of constant control quality, the controller can be embodied as a PID controller or as a status controller, which is furthermore adaptively embodied; that is, it adapts itself constantly to currently prevailing conditions (such as a varying yarn tension, bearing friction, etc.). Predictive closed-loop control, that is, taking a previously known course into account, can also be performed. By means of other known closed-loop control principles, an ever greater refinement in the control quality can be achieved.

The set-point course of the yarn laying can be adjusted by means of various parameters that promote the buildup of windings on the cheese. By providing a varying amplitude, for instance, a stroke expansion of the yarn guide and thus a lessening of the edge hardness or edge curvature of the cheese can be attained. A wide variety of winding structures, such as precision or graduated precision windings, can also be achieved without mechanical adjustment work. The adjustment of the desired width of the cheese also involves only minimal effort.

The spiral springs 20 and 21 can be selected such that the characteristic curves extend, not in a straight line to the direction-reversal locations, but progressively, so that to attain the same oscillation, the electromechanical drive mechanism is relieved. In that case the oscillation is only approximately harmonic, but this is no problem since the course of oscillation remains uniform.

Figure 3:
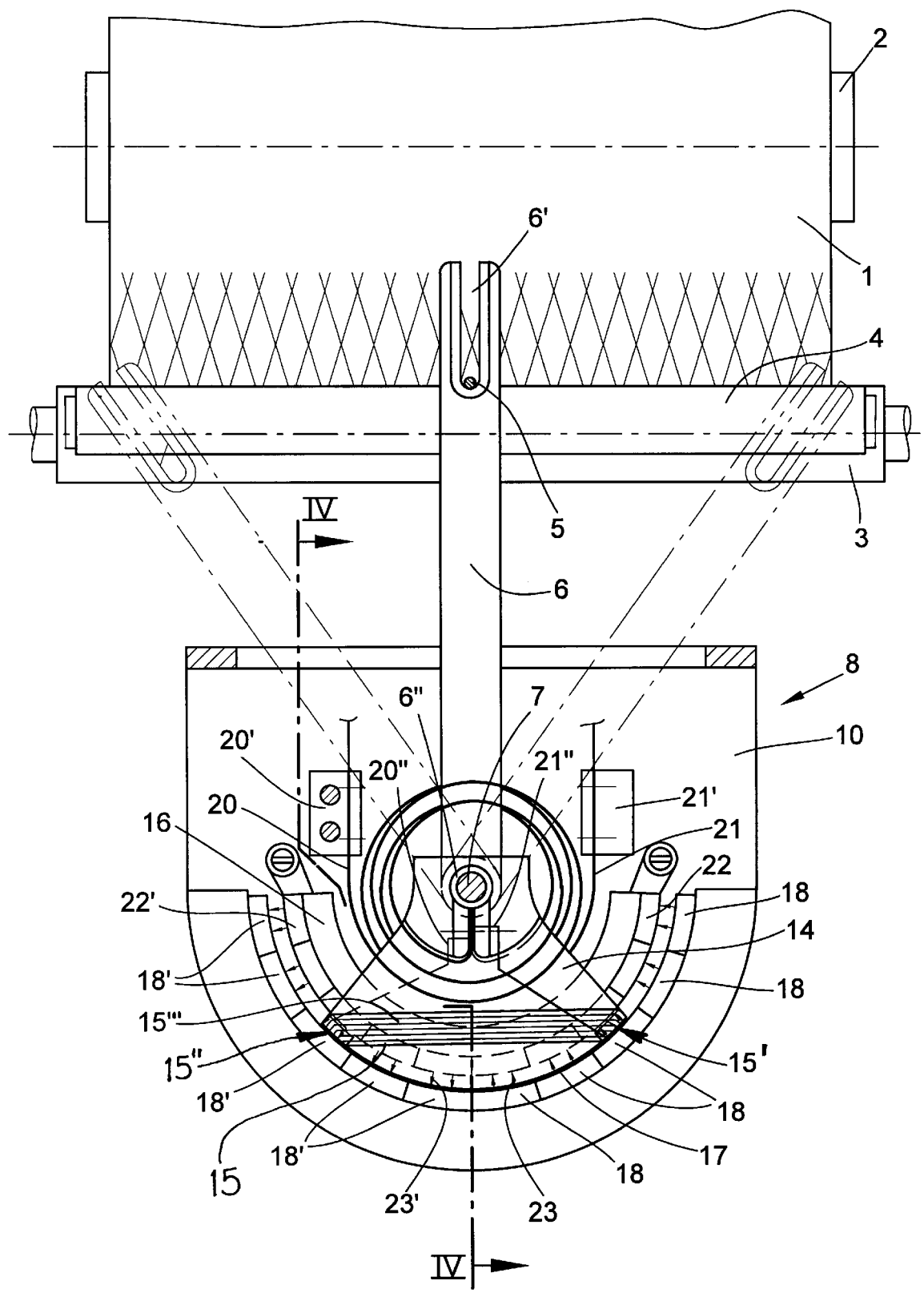
FIG. 3 is a front view of a yarn guide having an electromechanical drive mechanism in accordance with a second embodiment of the present invention.
Figure 4:
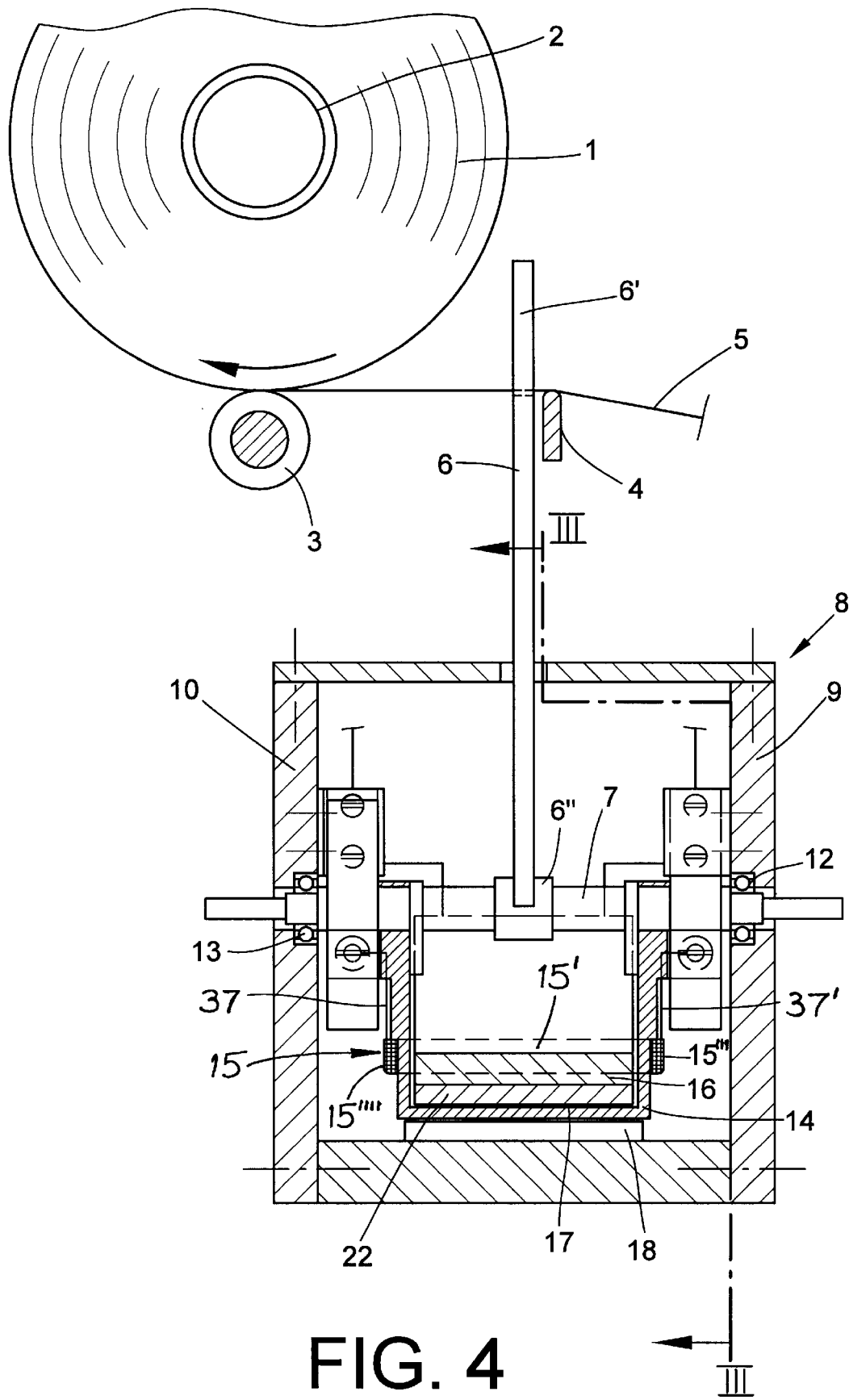
FIG. 4 is a side sectional view of the yarn guide of the embodiment of FIG. 3 taken along the section line IV—IV thereof.

In a variant of the invention, shown in FIGS. 3 and 4, magnets 18, 18' and 22, 22' are disposed on both sides of the air gap 17. This further increases the magnetic flux density in the air gap 17, and thus a higher moment on the yarn guide is also possible, for the same electrical power and for the same dimensioning of the coil 15. It is understood that respective magnets 18, 22 and 18', 22' face one another with different polarity to the left and right of the air gap 17.

Figure 5:
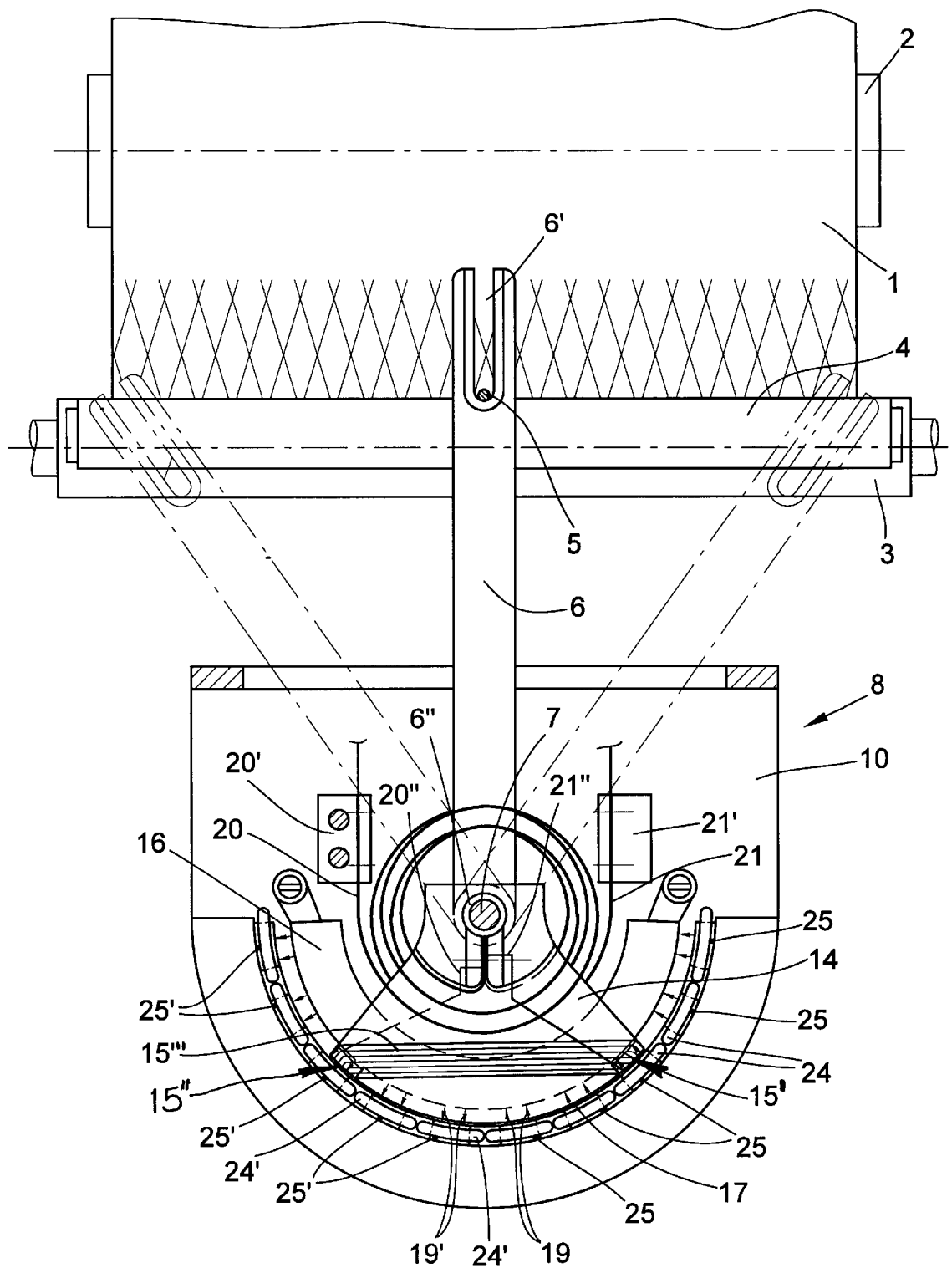
FIG. 5 is a front view of a yarn guide having an electromechanical drive mechanism in accordance with a third embodiment of the present invention.

In a further variant of the invention, shown only in a front view in FIG. 5, the permanent magnets 18 and 18' of the first variant are replaced by electromagnets, which are formed by coils 24, 24' that have cores 25, 25'. The power supply to these coils is not shown separately here. The coils are insulated from the side walls 9 and 10, or these side walls are made of nonconductive material, such as plastic.

By means of the electromagnets formed, magnetic field lines with the orientations corresponding to the previous examples are embodied. However, an even stronger magnetic field can be attained, which can also be adjusted differently, for example as a function of the load on the arm guide 6.

Figure 6:
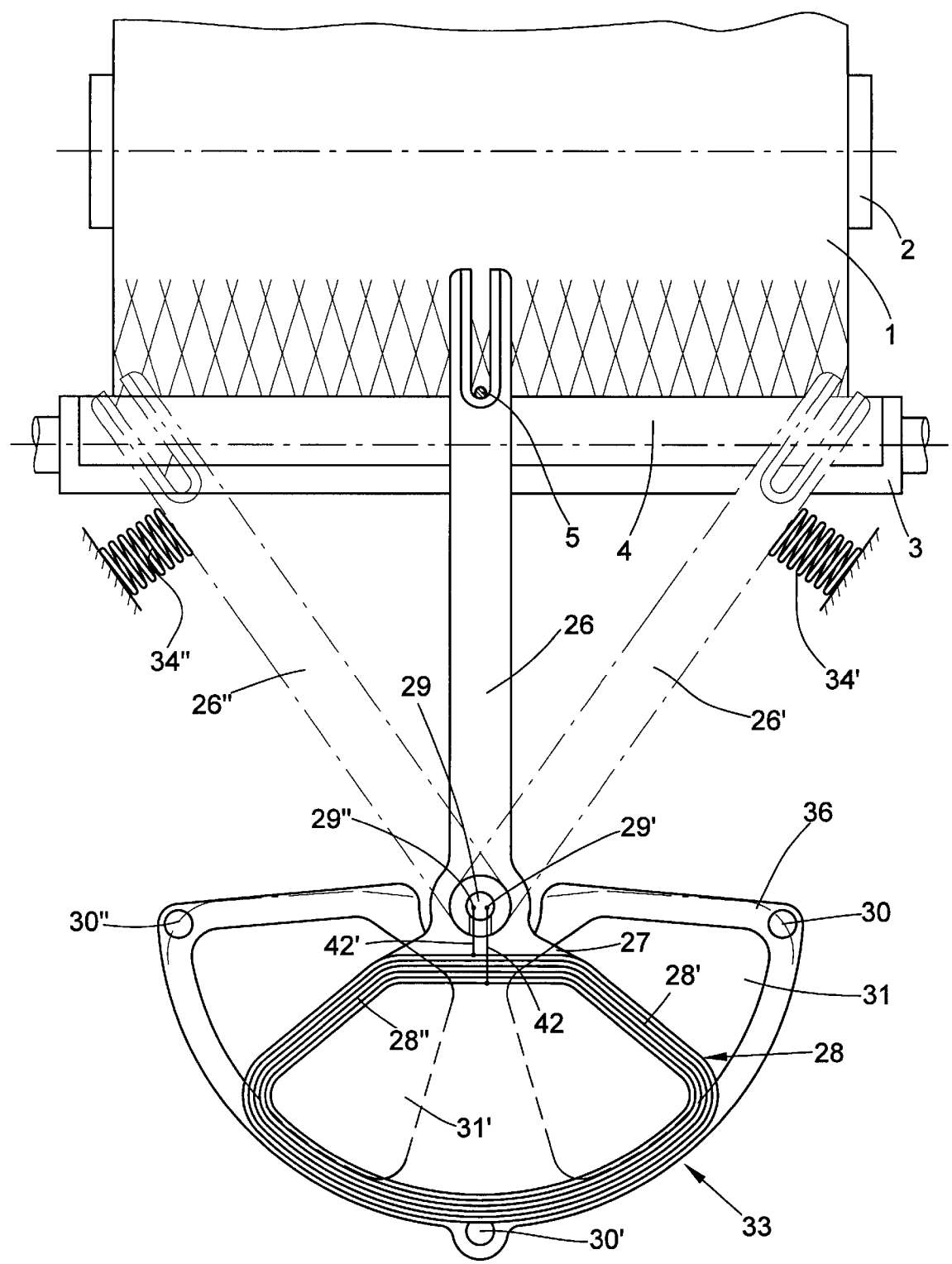
FIG. 6 is a front view of a yarn guide having an electromechanical drive mechanism in accordance with a fourth embodiment of the present invention.
Figure 7:
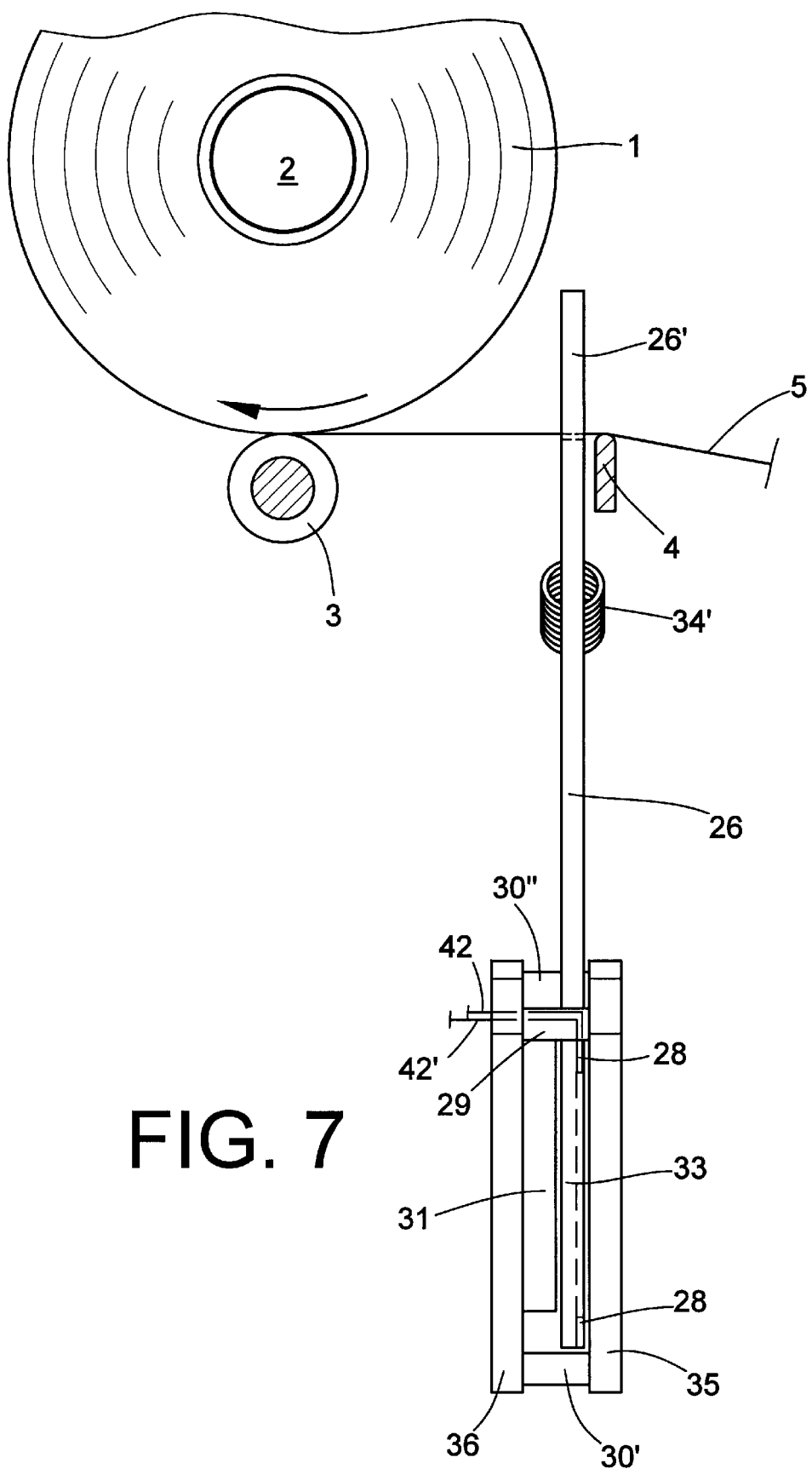
FIG. 7 is a side view of the yarn guide of the embodiment of FIG. 6.

In FIGS. 6 and 7, a variant that differs more markedly from the previous exemplary embodiments is shown. The air gap here is rotated 90° relative to the variants already described; or in other words, the air gap is located in a plane that intersects the pivot axis of the yarn guide 26. Magnets 31 and 31' are embodied in the shape of a circular segment and are secured, for example, by screw connections 30, 30' and 30", to a magnet carrier 36 that at the same time is embodied as a side wall serving as a yoke. Accordingly, yokes 35 and 36 (FIG. 7) are present on both sides of the arrangement of magnets 31 and 31', and these yokes are intended to conduct the magnetic flux as much as possible without significant losses.

An electrical coil 28 is also disposed on the yarn guide 26 on coil carrier 33; similarly to the magnets 31 and 31', this coil has the shape of a circular segment as much as possible. Lead lines 42 and 42' are extended centrally through a shaft 29, on which the yarn guide 26 is secured, to the outside of the yarn guide 26. Bores 29' and 29" are made in this shaft 29 for this purpose. Because of the close placement to the pivot point, an external power supply (not shown) is deflected only slightly by the oscillation of the yarn guide 26, so that no overly great demands are made of its flexibility.

Compression springs 34' and 34" reinforce the reversal of the direction of motion of the yarn guide 26 in the region of the direction-reversal locations. These compression springs 34' and 34" are mechanically adjustable to vary the stroke.

In this last laying system shown, it is understood that it is also possible, to use spiral springs instead of the compression springs 34' and 34", as in the preceding examples, and these springs then have the aforementioned examples.

The closed-loop control of the drive is effected analogously to the preceding examples. An angle encoder in the form of an incremental counter (not shown) can also correspond to the preceding examples.

Figure 8:
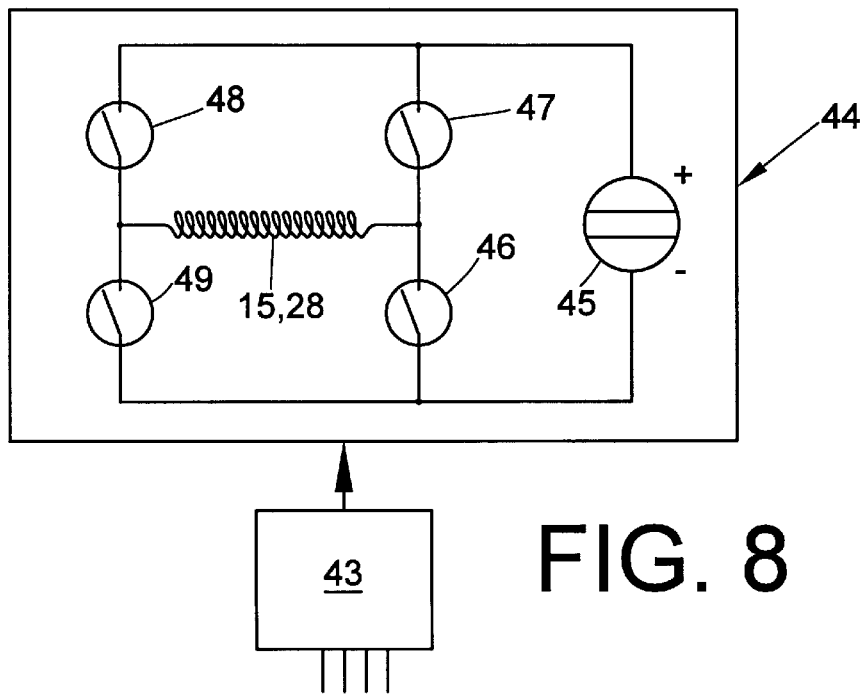
FIG. 8 is a block circuit diagram of an end stage in accordance with an embodiment of the present invention.

In FIG. 8, an end stage 44 is shown, in simplified form, which can be used for supplying voltage to the coil 15 or 28.

While a supply voltage source is indicated at 45, switches 46 through 48, embodied for instance by field effect transistors, are provided for controlling the current supply to the coil 15, 28. These switches 46 through 48 are triggered by the control device 43, as schematically represented by arrows. The switches 46 and 48, and the switches 47 and 49, are always switched in the same way. By varying the respective ON time, the operating voltage specified by the supply voltage source 45 is modulated as needed. This modulation includes both the amount and the sign of the voltage applied, so that the moment required at every point in the oscillating motion of the yarn guide can be generated.

Figure 9:
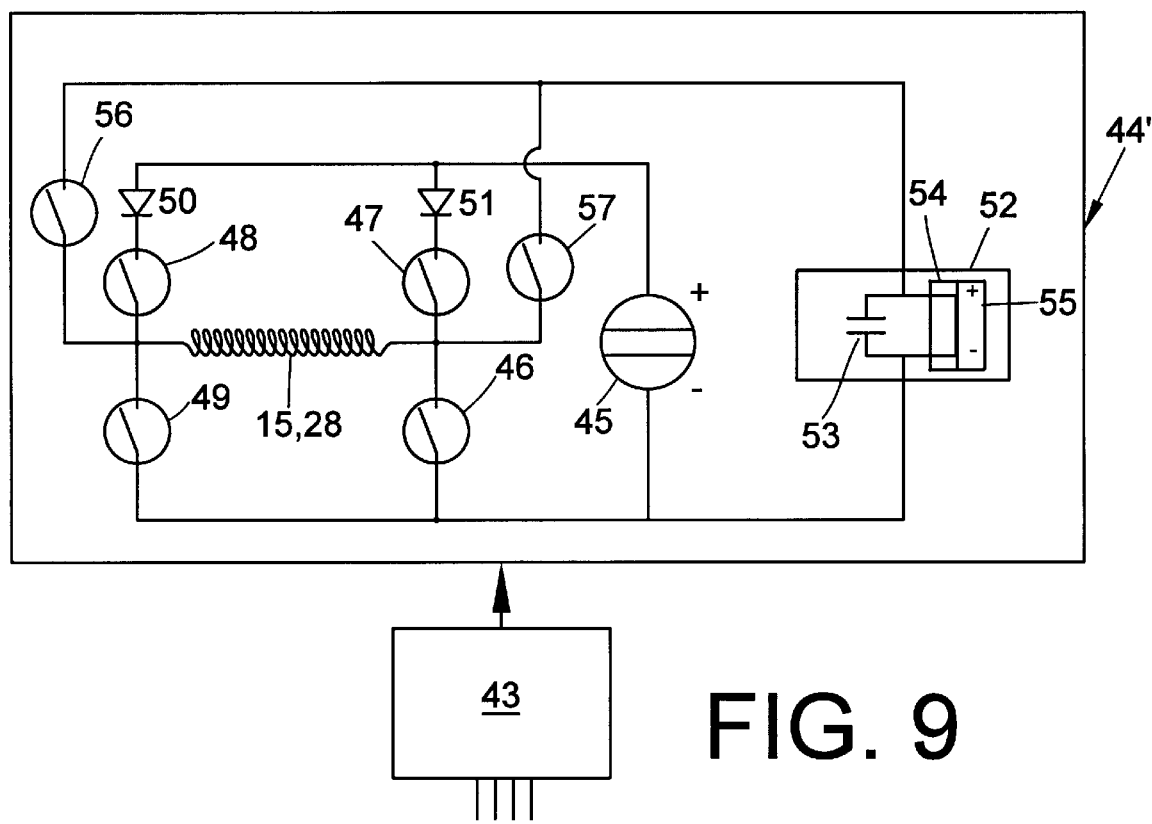
FIG. 9 is a block circuit diagram of an alternative embodiment of an end stage in accordance with the present invention.

The end stage 44' shown in FIG. 9 is supplemented with a second supply voltage source 52, which can likewise be connected to the coil 15, 28 via switches 56 and 57. These switches 56 and 57, also embodied as field effect transistors, are also triggered by the control device 43 which is preferably a microprocessor as already noted. They are actuated in alternation at the turning points of the yarn guide 6, 26.

The second supply voltage source 52 furnishes a multiple of that furnished by the first supply voltage source 45. Thus, either a higher operating voltage is present from the very beginning at the input 55, or it is generated by means of a charge pump 54 in the capacitor 53. The charge pump 54 is advantageously adjusted such that it provides the required charge for the capacitor 53 in each case up until the next switching event of one of the two switches 56 or 57. To that end, the charge pump 54 can likewise be adjusted by the control device 43 as a function of the yarn guide frequency.

By means of the modified end stage 44', which has a second supply voltage source 52, it is possible to make a higher voltage available abruptly at the direction-reversal locations of the yarn guide, the effect of which is a faster increase in the current flow and thus in the moment generated. Since this second supply voltage source 52 is turned on only very briefly at any given time, it is possible to use the supply voltage source 45 exclusively over virtually the entire range of the yarn guide 6, 26, which makes for substantially higher efficiency.

When the second voltage source 52 is switched on via the switches 47 and 48, corresponding diodes 50 and 51 are placed between them to prevent a strong current from flowing out to the first supply voltage source 35 and causing damage to this supply voltage source.

It will therefore be readily understood by those persons skilled in the art that the present invention is susceptible of broad utility and application. Many embodiments and adaptations of the present invention other than those herein described, as well as many variations, modifications and equivalent arrangements, will be apparent from or reasonably suggested by the present invention and the foregoing description thereof, without departing from the substance or scope of the present invention. Accordingly, while the present invention has been described herein in detail in relation to its preferred embodiment, it is to be understood that this disclosure is only illustrative and exemplary of the present invention and is made merely for purposes of providing a full and enabling disclosure of the invention. The foregoing disclosure is not intended or to be construed to limit the present invention or otherwise to exclude any such other embodiments, adaptations, variations, modifications and equivalent arrangements, the present invention being limited only by the claims appended hereto and the equivalents thereof.

What is claimed is:

1. A yarn guide for delivering a yarn to a rotationally driven takeup bobbin in a bobbin winder of a textile machine, the yarn guide comprising:
    (a) a fork-like yarn guide pivoted about a pivot axis oriented substantially perpendicularly to the axis of the takeup bobbin, and
    (b) an electromagnetic mechanism for driving reciprocal pivoting movement of the yarn guide to impart a traversing motion to a yarn for creating a cross-wound form to the bobbin, the electromagnetic drive mechanism comprising:
        (i) an air gap having at least a first side and a second side and being penetrated by magnetic field lines,
        (ii) a plurality of magnets disposed along the air gap for generating magnetic field lines extending substantially perpendicularly through the air gap,
        (iii) a plurality of yokes disposed on at least the first and second sides of the air gap for conducting the magnetic flux, and
        (iv) at least one electrical coil extending into the air gap and being connected with the yarn guide for reciprocal movement within the air gap with the traversing motion of the yarn guide, wherein current may be controllably supplied to the at least one electrical coil.

2. The yarn guide in accordance with claim 1, characterized in that the traversing motion of the yarn guide extends over a defined range, the at least one electrical coil is pivotable over a pivoting range corresponding to the defined range of the traversing motion, and the air gap extends over the pivoting range of the electrical coil.

3. The yarn guide in accordance with claim 1, characterized in that substantially all of the magnets are disposed on the first side of the air gap.

4. The yarn guide in accordance with claim 1, characterized in that the magnets are disposed on the first and second sides of the air gap in an arrangement wherein magnets with opposed polarity face one another directly.

5. The yarn guide in accordance with claim 1, characterized in that the magnets are permanent magnets.

6. The yarn guide in accordance with claim 1, characterized in that the magnets are electromagnets.

7. The yarn guide in accordance with claim 1, characterized in that the magnets are disposed in a first magnet region and a second magnet region defining a boundary between the first and second regions generally located adjacent a center of the reciprocal movement of the electrical coil, the magnets having selected respective polarities and are relatively arranged to produce magnetic flux in a first direction in a first portion of the air gap and magnetic flux in a second direction generally opposite the first direction in a second portion of the air gap, the electrical coil comprising a first winding leg extending into the first portion of the air gap and a second winding leg extending into the second portion of the air gap, the two winding legs having current flowing through them in opposite directions, and each of the winding legs remaining within the respectively associated air gap portion during the entire electric coil pivoting range.

8. The yarn guide in accordance with claim 7, characterized in that the electrical coil is substantially rectangular having a first pair of parallel sides formed by the winding legs and a second pair of parallel sides and wherein the first pair of parallel sides extend into the air gap and the second pair of parallel sides are disposed outside the air gap.

9. The yarn guide in accordance with claim 1, characterized in that the air gap is disposed concentrically to the pivot axis of the yarn guide, and wherein the electrical coil has a center axis intersecting the pivot axis of the yarn guide at substantially a right angle.

10. The yarn guide in accordance with claim 1, characterized in that the air gap is disposed and embodied as an arcuate segment at substantially a right angle to the pivot axis of the yarn guide, and wherein the electrical coil further comprises a winding plane located in the plane defined by the air gap.

11. The yarn guide in accordance with claim 10, characterized in that the electrical coil is formed substantially in the shape of an arcuate segment and further comprises two radially extending winding legs.

12. The yarn guide in accordance with claim 1, characterized in that the yarn guide further comprises a control device for acting upon an end stage to apply a voltage to the electrical coil as a function of the position of the yarn guide, the voltage correlating in amount and sign with the course of motion sought.

13. The yarn guide in accordance with claim 12, characterized in that the end stage has a first supply voltage source triggered by the control device for switchably supplying the electrical coil with a first operating voltage by means of pulse width modulation.

14. The yarn guide in accordance with claim 13, characterized in that the end stage has a second supply voltage source for providing a second operating voltage that is a multiple of the first operating voltage at the first-mentioned supply voltage source, and characterized further in that the traversing motion of the yarn guide changes direction at a plurality of direction-reversal locations and that the second supply voltage source is connectable to the electrical coil by the control device while the yarn guide is in the vicinity of the direction-reversal locations.

15. The yarn guide in accordance with claim 14, characterized in that the second supply voltage source has a capacitor operable to have a capacitance corresponding to an energy demand of the end stage during the ON time of the second supply voltage source.

16. The yarn guide in accordance with claim 15, characterized in that the second voltage source has a charge pump for charging the capacitor.

17. The yarn guide in accordance with claim 16, characterized in that the charge pump is triggerable by the control device to cause the requisite charge duration to correspond to an interval between two successive clearing actions.

18. The yarn guide in accordance with claim 1, characterized in that the traversing motion of the yarn guide changes direction at a plurality of direction-reversal locations, and characterized further by mechanical energy storing means on at least the first and second sides of the air gap in the region of the direction-reversal locations for assisting the change of the direction of motion of the yarn guide.

19. The yarn guide in accordance with claim 18, characterized in that during the entire traversing motion of the yarn guide, the yarn guide is coupled permanently with at least one energy storing means having a potential energy which increases progressively from the center of the traversing motion to the direction-reversal locations for forming a substantially harmonically oscillating mechanical system; and characterized further in that the electromagnetic drive mechanism generates a predeterminable oscillation of the fork-like yarn guide.

20. The yarn guide in accordance with claim 19, characterized in that the at least one energy storing means comprises a spring.

21. The yarn guide in accordance with claim 20, characterized in that the spring is a torsion spring.

22. The yarn guide in accordance with claim 21, characterized in that the torsion spring is a spiral spring of band-like material.

23. The yarn guide in accordance with claim 22, characterized by two of the spiral springs.

24. The yarn guide in accordance with claim 23, characterized in that the two spiral springs have opposed spiral windings.

25. The yarn guide in accordance with claim 23, characterized in that the spiral springs are associated with the electromagnetic drive mechanism to supply operating current thereto.

* * * * *